United States Patent [19]
Hewlett

[11] Patent Number: 5,133,622
[45] Date of Patent: Jul. 28, 1992

[54] WATER DISTRIBUTION SYSTEM

[76] Inventor: Robert F. Hewlett, P.O. Box 270938, Tampa, Fla. 33688

[21] Appl. No.: 718,582

[22] Filed: Jun. 21, 1991

[51] Int. Cl.$^5$ ............................................. E02B 13/00
[52] U.S. Cl. ...................................... 405/39; 405/43; 405/51
[58] Field of Search ...................... 405/36, 38, 39, 43, 405/51

[56] References Cited

U.S. PATENT DOCUMENTS

| | | | |
|---|---|---|---|
| 3,307,360 | 3/1967 | Bailly | 405/38 |
| 3,461,675 | 8/1969 | Izatt | 405/38 |
| 3,762,170 | 10/1973 | Fitzhugh | 405/38 |
| 4,721,408 | 1/1988 | Hewlett | 405/36 X |

*Primary Examiner*—David H. Corbin
*Attorney, Agent, or Firm*—Pettis & McDonald

[57] ABSTRACT

An improved water distribution system of the type that includes a distribution conduit and an irrifluent pipe disposed on or below ground for dispersing water at a controlled rate. A first pump connected to the distribution conduit passes the water through the main delivery conduit and through apertures in the irrifluent pipe. Solid matter collects within the irrifluent pipes when the dispersion of the water through apertures in the irrifluent pipes is at low pressure. The improvement includes a return conduit that is disposed in fluid communicating relation to the irrifluent pipe, and a second pump, connected in fluid flow relation to the return conduit. The second pump is operated intermittently with the first pump to increase the flow rate sufficiently to flush the collected solid matter from the irrifluent pipes and through the return conduit.

9 Claims, 1 Drawing Sheet

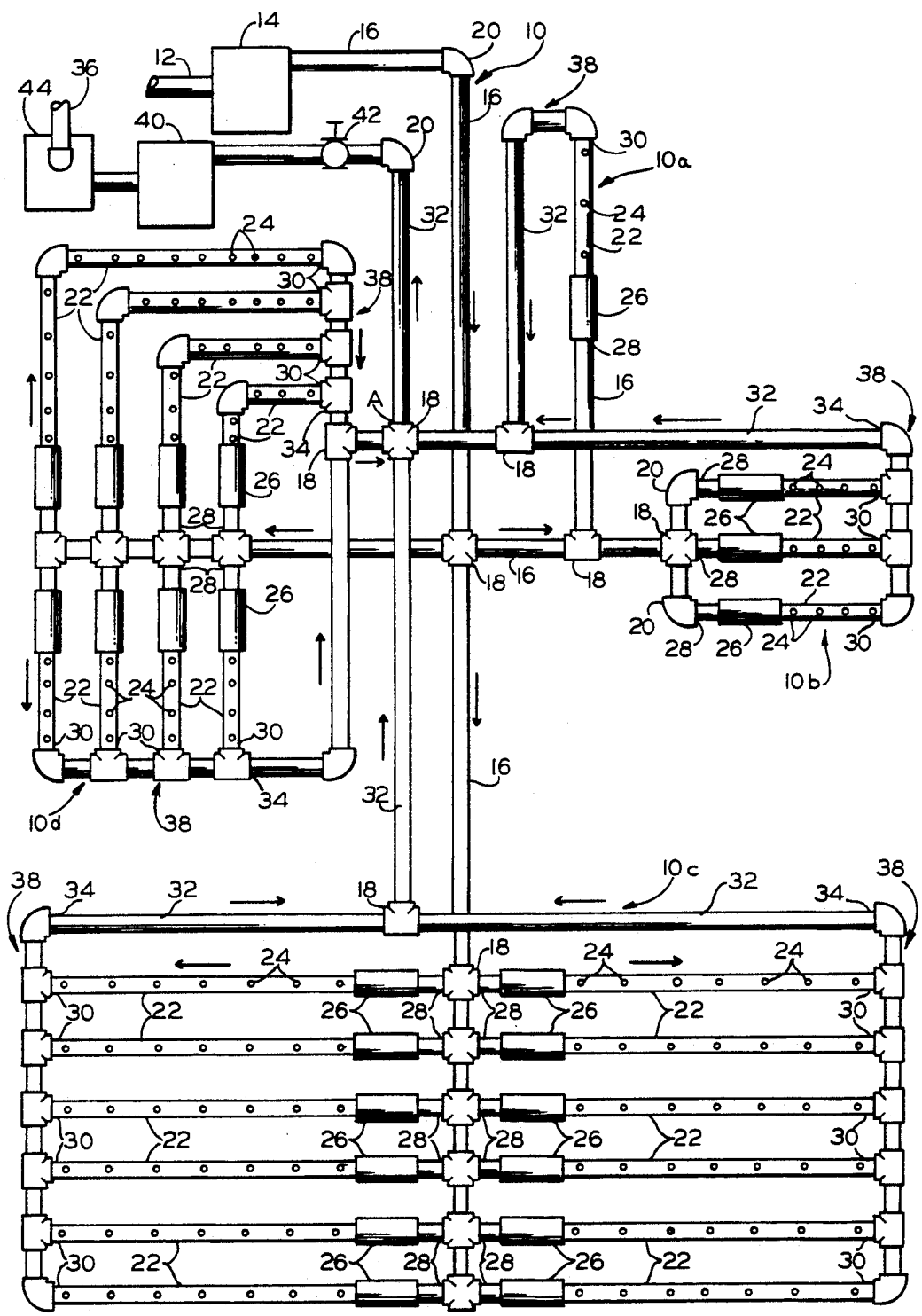
Fig_1_

WATER DISTRIBUTION SYSTEM

BACKGROUND OF THE INVENTION

1. Field of the Invention

The present invention relates to an improved water distribution system of the type including a source of water, at least one main delivery conduit, at least one irrifluent pipe and pump means for passing water from the source through the main delivery conduit, into the irrifluent pipe, one end of which is connected to the delivery conduit, and out apertures in the irrifluent pipe. The improvement includes at least one return conduit disposed in fluid communicating relation to the other end of the irrifluent pipe and a second pump means intermittently operated to move the water from the irrifluent pipe, through the return conduit and out the free end of the return conduit so that any solid matter that has collected within the irrifluent pipe may be flushed from the distribution system.

2. Description of the Prior Art

The relative desirability of irrigating an area by underground water distribution, as opposed to above ground spraying, has long been recognized. A most obvious benefit from subsurface irrigation is substantial elimination of water loss by evaporation. Furthermore subservice distribution clearly places the water adjacent to the plant roots where it is most beneficial.

The prior art patent literature discloses and teaches numerous devices for underground distribution systems, including U.S. Pat. No. 3,946,762 to Green, U.S. Pat. No. 2,798,768 to Babin, U.S. Pat. No. 3,899,135 to O'Brien and U.S. Pat. No. 4,721,408 issued to Robert F. Hewlett, the inventor of the improvement herein disclosed and claimed.

Water distribution systems, particularly those below ground, must be cleaned frequently to remove solid matter which has collected within the irrifluent piping. The solid matter is either deposited by the water itself or has infiltrated into the irrifluent pipes through the pipe's apertures from the surrounding soil.

U.S. Pat. No. 4,881,846, issued to Burkstaller, discloses underground piping which is laid in a grid comprising a plurality of parallel perforated pipes, one end of each of which is attached to a water supply header and the other end of which is attached to a drain header with appropriate valves attached. This system is designed to provide a controlled moisture content within a volume of soil and does not provide a means for removal of built up solid matter within the distribution system.

U.S. Pat. No. 3,908,385, issued to Daniel et al., discloses another system for maintaining the moisture content within a selected volume of soil at a specific level. The patent discloses a set of perforated pipe laid in a parallel grid arrangement and for withdrawing water from the soil. The pipes are attached to a drain header for collection of the water. The control system disclosed within the patent permits the water flow to be reversed so that the drainage system can be used to irrigate the soil. This structure while providing dual use for a drainage system does not provide a means for removal of solid matter from the perforated pipe.

U.S. Pat. No. 4,538,377, issued to Thornton, discloses a dual irrigation and drainage system that is installed underground. However, the system does not disclose an interconnection which would provide a means for removing solid matter that has collected within the distribution system.

As none of the prior art has solved the problem of accumulated matter within the pipes, it remains clear that there is a need for a distribution system that will permit active flushing to frequently remove accumulated solid matter. If such solid matter is not easily removed from such distribution systems, particularly those that are underground, the systems quickly become clogged resulting in lost time and high expenditures to disassemble for cleaning or for making repairs.

SUMMARY OF THE INVENTION

The present invention relates to an improved water distribution system for primarily subsurface application of water to the soil, but may also be used with above ground systems. The water distribution system includes a source of water, at least one main delivery conduit for the water, at least one irrifluent pipe disposed in fluid communicating relation to the main delivery conduit and a means for passing the water from its source through the main delivery conduit, and into the irrifluent pipe. The water then passes through apertures in the irrifluent pipe and into the surrounding soil. A return conduit is disposed in fluid communicating relation to the irrifluent pipe. A second pump means is connected in fluid flow communication with the irrifluent pipe for moving the water and solid matter from the irrifluent pipe and through the return conduit. This second pump means is intermittently operated simultaneously with the first pump means. The pumps are so sized that when both pump means are operating, sufficient water flow is attained to flush a portion of the solid matter that has collected in the irrifluent pipe from the irrifluent pipe, through the return conduit, and out from the water distribution system.

The invention, accordingly, comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a schematic plan view of a typical installation of the improved water distribution system of this invention.

Similar reference characters refer to similar parts throughout the several views of the drawings.

DETAILED DESCRIPTION

A preferred embodiment for the improved water distribution system is illustrated in the drawing FIG. 1, in which the water distribution system is generally indicated as 10. It is noted that the drawing figure is not to scale so that the structural details may be better illustrated. FIG. 1 illustrates four separate subsystems 10a, 10b, 10c and 10d which, in this embodiment, form a part of the overall water distribution system 10, but are simply examples of typical system layouts. Each of these subsystems feed off the same source pipe 12, first pump means 14 and at least one main delivery conduit 16. As can be seen, the preferred embodiment illustrated in FIG. 1 includes a plurality of main delivery conduits 16. The main delivery conduit 16 is assembled using numerous couplings 18 which are shown in FIG. 1 as being "T" and cross couplings; however, any suitable coupling may be used in the design of a system. A plurality of elbows 20, which in FIG. 1 are predominantly 90 degree angled elbows may be formed to any convenient angle for the assembly of the delivery conduit 16. The main delivery conduit 16 is connected in fluid flow relationship to at least one irrifluent pipe 22 by means of the appropriate elbows 20 or couplings 18. The irrifluent pipe 22 comprises a series of apertures 24 that are sized to permit the desired amount of water to be distributed to the surrounding soil. The irrifluent pipe 22 also may comprise, as shown in the preferred embodiment of FIG. 1, a control filter means 26.

The water distribution system as described above, including the control filter means has been further disclosed and claimed in the inventor's U.S. Pat. No. 4,721,408, the disclosure of which is incorporated herein. While the improved water distribution system 10 is shown in conjunction with the structure as disclosed in U.S. Pat. No. 4,721,408, these improvements may also be used in conjunction with other similar distribution systems whether used below ground or above ground or with or without the control filter means. These water distribution systems are frequently low pressure systems normally operating within the range of 5 to 15 psi depending upon the rate of flow needed for the purposes intended, for example, irrigation of different sizes or types of plants which require different quantities of water. This low flow rate allows solid matter to collect within the irrifluent piping 22 blocking the apertures 24 and preventing the distribution of water or other fluids. The collected solid matter may be carried into the irrifluent pipes 22 by the source water, may infiltrate into the piping through the apertures 24 or may enter the irrifluent piping 22 by other means. In the old systems the irrifluent pipe 22 is capped off at its free ends providing a dead end where the solid matter is captured. There are no means of removing the collected solid matter without removal of the irrifluent pipe 22.

The irrifluent pipe 22 has a first end 28 and a second end 30; the first end 28 is connected to a main delivery conduit 16. The improved water distribution system 10 includes a return conduit 32, that has at least one first end 34 and a second end 36. The first end 34 is connected in fluid flow communication to the second end 30 of the irrifluent pipe 22. The improved water distribution system 10 includes at least one link means 38 that connects the second end 30 of irrifluent pipe 22 to the first end 34 of the return conduit 32. As can be seen in configuration 10a a link means 38 is used to connected a single irrifluent pipe 22 with the first end 34 of the return conduit 32. However, in configuration 10b a link means 38 is used to connect the second ends 30 of a plurality of irrifluent pipes 22 to a first end 34 of the return conduit 32. In each of configurations 10c and 10d two link means 38 are used to join a plurality of irrifluent pipes 22 to the return conduit 32. The link means 38 is comprised of couplings 18 and elbows 20 which form a manifold type structure for collection of the water to be returned through the return conduit 32.

A second pump means 40 is connected in fluid flow relationship with the return conduit 32 proximal to the second end 36 of the return conduit 32. The pump 40 must be connected downstream from the last connection of a subsystem 10a, 10b, 10c, or 10d, which in the preferred embodiment of FIG. 1 is point A. The direction of flow within the distribution system 10 is indicated by a series of arrows. The second pump means 40 may preferably be, without limitation, a diaphragm pump, but any suitable device for moving fluid from one point to another may be used.

A valve means 42 is connected to the return conduit 32 upstream from the pump means and downstream from point A. The valve means 42 may be any suitable device which will regulate the flow of a fluid, either preventing flow, permitting it to flow or controlling the rate of flow. The valve means 42 is not always necessary for the proper operation of the improved distribution system 10. Usually the flow of water through the distribution system 10 is at such low pressure that there is sufficient resistance within the return conduit 32 that the water will not flow through the return conduit 32 and out its second end 36. However, if the distribution system 10 is operating at higher pressures or the forces of gravity cause the water to move through the return conduit 32, inadequate pressures may exist within the irrifluent pipes 22 to provide efficient distribution of the water. Therefore, the valve means 42 may be required to be placed in a closed position to prevent the loss of water from the distribution system 10 and the loss of pressure within the irrifluent pipes 22.

The second pump means 40 is sized so that when it is working in conjunction with the first pump means 14 a sufficient flow of water is created through the irrifluent pipes 22 and the return conduit 32 to create a flushing action for removal of the collected solid matter. If a valve means 42 is used in the system, it, of course, must be in the open position to permit flow when the second pump means 40 is being operated. Flushing is accomplished only intermittently to prevent interference with proper distribution of the water through the irrifluent pipes 22 and to prevent waste of water.

A filter means 44 may be connected in fluid flow relation with the return conduit 32 either downstream from the pump means 40 as shown in FIG. 1 or, if necessary to protect the pump means 40 from damage from the solid matter, it may be placed upstream of the second pump means 40.

The water which exits the distribution system 10 from the second end 36 of the return conduit 32 may be routed to a settling pond for future use or, if properly filtered, it may be passed through the source pipe 12 for distribution.

Having thus set forth a preferred construction for the improved water distribution system 10 of this invention, it is to be remembered that this is but a preferred embodiment. Attention is now invited to a description of the use of the improved water distribution system 10.

The improved water distribution system illustrated in FIG. 1 may, of course, be installed in its entirety or the improved portion may be added as a retrofit package to an existing distribution system. When a system similar to that illustrated in FIG. 1 has been constructed and installed, usually below ground, it may be easily operated and maintained. The source water may be obtained from any one of a number of different or combined sources, for example, from wells, rivers, lakes, industrial plants, laundries and sewage treatment plants. The source pipe 12 is connected to any one of these sources in an appropriate fashion so that first pump means 14 may be operated to withdraw water from the source through the source pipe 12 and pass it through the main delivery conduit 16 and to an irrifluent pipe 22. The pump means 14 is designed to control the water pressure within the irrifluent pipe 22 to ensure that the water passes through the apertures 24 at the desired rate. Additional control can be obtained by utilizing the control filter means 26 as described in U.S. Pat. No. 4,721,408. If, while pump means 14 is operating, water flows from the second end of the return conduit 32, then valve means 42 must be operated to place it in a closed position. After a predetermined time period valve 42 will be operated to place it in the open position and the second pump means 40 will be operated. The operation of second pump means 40 in conjunction with first pump means 14 will provide sufficient water flow to flush the irrifluent pipes 22 of most solid matter that has collected in the irrifluent pipes 22. The water and the solid matter is pumped through the return conduit 32, and then is pumped through the filter means 44 where at least a portion of the solid matter is removed. When the flushing is complete, the second pump means 40 is shut down and valve 42 is closed. Pump means 14 will continue to operate and the pressure within the irrifluent piping 22 will return to its preferred pressure of between 5 and 15 psi. Water will then again flow from the apertures 24 in the irrifluent pipe 22 providing the distribution desired.

It will thus be seen that the objects set forth above, among those made apparent from the proceeding description, are efficiently attained and, since certain changes may be made in the above apparatus without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An improved water distribution system of the type including a source of water, at least one main delivery conduit, at least one irrifluent pipe disposed in fluid communicating relation to the main delivery conduit, and a first pump means for passing water from the source through the main delivery conduit and through the irrifluent pipe, said improvement comprising:
    said irrifluent pipe having a first and a second end, said first end being connected to said main delivery conduit;
    at least one return conduit having a first end and a second end, said first end being connected in fluid flow communication with said second end of said irrifluent pipe; and
    a second pump means connected in fluid flow communication with said return conduit proximal said second end of said return conduit, said second pump means being selectively operable with the first pump means, whereby the water and the solid matter contained in the water is intermittently moved from the irrifluent pipe through said return conduit and out said second end of said return conduit.

2. An improved water distribution system as in claim 1 further comprising at least one link means connecting said first end of said return conduit to said second end of said irrifluent pipe.

3. An improved water distribution system as in claim 1 wherein said system further comprises a valve means connected in fluid flow communication to said return conduit proximal said second end of said return conduit and upstream of said second pump means, said valve means being operable between a closed position and an open position so that water flow through said return pipe is prevented when said valve is in said closed position and the water may flow through said return pipe when said valve is in said open position.

4. An improved water distribution system as in claim 1 further comprising a filter means connected in fluid flow communication to said return conduit proximal said second end of said return conduit, whereby a portion of said solid matter is removed from said water.

5. An improved water distribution system as in claim 4 wherein said filter means is connected to said return conduit downstream of said second pump means.

6. An improved water distribution system as in claim 1 wherein said return line is disposed below ground.

7. A method for removing solid matter from a water distribution system of the type including a source of water, at least one main delivery conduit, at least one irrifluent pipe disposed in fluid communication relation to the main delivery conduit, and a first pump means for passing water from the source through the main delivery conduit and through the irrifluent pipe, comprising the steps of:
    a. connecting a first end of a return conduit to a second end of said irrifluent pipe;
    b. connecting a second pump means in fluid flow communication with said return conduit proximal the second end of said return conduit;
    c. operating said first pump means to pass the water and any solid matter contained therein from the source through said delivery conduit, to said irrifluent pipes; and
    d. operating said second pump means simultaneously with said first pump means thereby moving the water and solid matter from the irrifluent pipes, through and out a second end of said return conduit, said second pump means operating intermittently.

8. The method of claim 7, wherein step c includes the initial steps of connecting a valve in fluid flow communication with said return conduit up stream from said second pump means and closing said valve means so that any flow of water and solid matter is prevented from flowing therethrough and wherein step d includes the initial step of opening said valve so that water and solid matter may flow through said return conduit.

9. The method of claim 7, wherein the method further comprises the steps of
    e. connecting a filter means in fluid flow communication with said return conduit; and
    f. filtering said water to remove a portion of said solid matter.

* * * * *